United States Patent [19]

Tsujimoto

[11] 3,760,699
[45] Sept. 25, 1973

[54] CAMERA CONNECTED WITH ELECTRONIC FLASH DEVICE
[75] Inventor: Kayoshi Tsujimoto, Osaka, Japan
[73] Assignee: Minolta Camera Kabushiki Kaisha, Osaka, Japan
[22] Filed: June 23, 1971
[21] Appl. No.: 155,709

[30] Foreign Application Priority Data
June 23, 1970 Japan.............................. 45/54021
June 26, 1970 Japan.............................. 45/55276

[52] U.S. Cl.............. 95/10 C, 95/11 R, 95/11.5 R, 95/64 C, 95/53 E, 95/31 FS
[51] Int. Cl...... G03b 7/04, G03b 9/02, G03b 19/00
[58] Field of Search...................... 95/11 R, 11.5 R, 95/64 R, 64 C, 31 FS, 53 E, 53 EA, 53 EB, 10 C, 10 CT; 315/151

[56] References Cited
UNITED STATES PATENTS
3,461,783  8/1969  Fujii................................. 95/10 C
3,485,154  12/1969  Yamada......................... 95/11 R X
3,541,387  11/1970  Ackermann....................... 315/151

Primary Examiner—Robert P. Greiner
Attorney—Watson, Cole, Grindle & Watson

[57] ABSTRACT

Circuitry for controlling the exposure of an electronic flash device includes a light measuring circuit for receiving light from an object illuminated by an electronic flash and generating current in response thereto whereby the flash is terminated at a predetermined level. The predetermined level is adjusted by biasing means which are responsive to the diaphragm aperture setting and the film speed setting. In an alternative embodiment the predetermined level for terminating the flash is also adjusted in accordance with the indication of an exposure meter which is actuated by a second light measuring circuit.

10 Claims, 6 Drawing Figures

CAMERA CONNECTED WITH ELECTRONIC FLASH DEVICE

BACKGROUND OF THE INVENTION

The present invention relates to an electronic flash device for use with a photographic camera, and more particularly to such a camera provided with a control circuit for controlling an electronic flash automatically by integrating the reflected light rays from an object, in accordance with the diaphragm setting value and the sensitivity of a film used is transmitted to the control circuit.

In prior art electronic flash devices, and particularly those of the automatic light adjusting type provided with a control circuit for controlling the radiation quantity of the electronic flash by integrating the reflected light rays from an object are well known. In such devices, to control the flash radiation it is necessary to manually adjust the control element in the control circuit of the electronic flash device in accordance with the diaphragm value and the sensitivity of the film used. Therefore, if the adjustment is not made or a misadjustment is made the proper exposure for a flash photograph is not obtained.

However, the diaphragm setting and the film sensitivity are used as a matter of course in a camera provided with an electric shutter for automatic exposure control, and are also necessary factors for adjusting and controlling the exposure in a camera. Therefore, they are available for controlling the radiation of a flash device.

Therefore, it is only necessary to store and transmit the required information to the electronic flash device, and then the radiation control circuit is designed to use the diaphragm and the film sensitivity settings automatically for controlling the electronic flash device so that manual control is not required.

OBJECTS OF THE INVENTION

One object of the present invention is to provide a camera which transmits information relating to the diaphragm and the film sensitivity settings automatically to an automatic light adjusting type electronic flash device.

A further object of the present invention is to provide in a camera of the type measuring light rays passing through an interchangeable lens for compensating the non-uniform opening diaphragm value of an interchangeable lens and use the film sensitivity as well as the diaphragm information to operate the flash control circuit for the electronic flash device.

Still another object of the present invention is to provide a camera having an electronic shutter in which the shutter speed is automatically controlled in accordance with the brightness of an object from the diaphragm setting and the film sensitivity used, in which a resistance value representative of the diaphragm and the film sensitivity settings adjusts the electronic shutter control circuit and the flash control circuit in the electronic flash device.

The foregoing and other objects of the present invention will be apparent from the following detailed description of an embodiment in accordance with the present invention.

SUMMARY OF THE INVENTION

The present invention relates to a camera with an electronic flash device which is constructed in order to attain the above-mentioned objects wherein an interlocking member for engaging with a diaphragm of the lens and a film sensitivity setting member in the camera is coupled with an operation mechanism, so that both operating values are transmitted to a flash quantity control circuit including a photosensitive element in the electronic flash device to adjust the trigger level thereof.

Further, the camera is provided with an exposure meter for measuring light rays passing through the opened diaphragm mounted on the interchangeable lens. The operation mechanism is interlocked with the exposure meter and is provided with a change-over member for adjusting the different opening diaphragm settings effected by the interchangeable lens.

The camera is also provided with an electronic shutter by which the shutter speed is controlled in accordance with a variable resistance set by the operation mechanism in accordance with the diaphragm setting and the film sensitivity setting, and the brightness of an object. The diaphragm value, for controlling the electronic shutter control circuit, and the resistance value in accordance with the film sensitivity are transmitted to the flash control circuit in the electronic flash device to adjust the trigger level thereof.

DESCRIPTION OF THE PREFERRED EMBODIMENT

Figure 1:
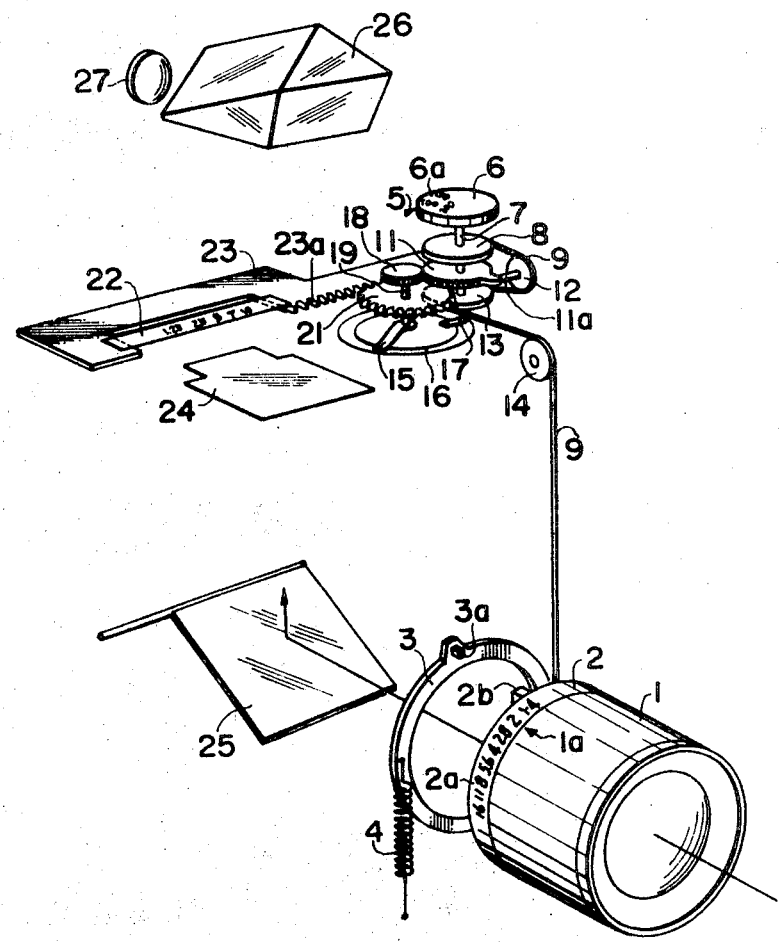
FIG. 1 is a perspective view showing the essential portion of a first embodiment in accordance with the present invention.

FIG. 1 shows the camera mechanism of the first embodiment in accordance with the present invention, wherein lens 1 is mounted in the camera body so that diaphragm setting ring 2 is rotatable and yet so as to be immovable in the direction of the optical axis. Diaphragm setting ring 2 sets the diaphragm value by locating index 1a marked on the outside of the lens barrel adjacent diaphragm scale 2a marked on ring 2. Coupling lug 2b projects from diaphragm setting ring 2 and engages with riser 3a of interlocking member 3 on the camera body. Interlocking member 3 has a counterclockwise turning tendency from spring 4 so that riser 3a engages with coupling lug 2b as described above, and to a point on the periphery of interlocking member 3 one end of wire 9 is fastened.

Film sensitivity setting dial 6 is fixed to spindle 7 provided on the camera main body and below dial 6 first pulley 8 also is fixed to spindle 7. The other end of wire 9 is fastened at a point on the periphery of pulley 8. And, below first pulley 8 sector gear 11 having arm 11a extending in the axial direction is mounted loosely on spindle 7 and has a clockwise turning tendency from a spring not shown in the drawing. On the tip of arm 11a second pulley 12 is rotatably mounted as shown in FIG. 1 and over pulley 12 wire 9 is spread. Additionally, below gear 11 third pulley 13 is rotatably mounted on spindle 7 and wire 9 is also spread over pulley 13 and fastened to interlocking member 3 as described above through guide pulley 14. The above structure forms a differential mechanism between film sensitivity setting dial 6 and diaphragm setting ring 2. Large gear 21 meshes with rack 23a of indication plate 23 and is mounted on rotatable central spindle 19 and gear 18 is mounted thereto to mesh with sector gear 11. Onto the lower end of central spindle 19 movable contact piece 15 is mounted and annular resistor 16 is provided so as to be in contact with movable contact piece 15. Fixed contact piece 17 is mounted on one portion of resistor 16. Electrical lead wires not shown in the drawing are respectively connected to both contacts to constitute variable resistance $R_1$ shown on the camera side C in FIG. 2.

Indication plate 23, to which distance scale indication plate 22 is fixed, is formed so as to slide to the right and left relative to viewing field frame 24 by the rotation of large gear 21 by means of a guide not shown in the drawing.

Reflector 25 is provided on the optical axis of lens 1 as shown in FIG. 1, and at the positions where light rays reflected by reflector 25 are projected, viewing field frame 24 and pentagonal prism 26 are mounted and through eyepiece 27 an object can be observed.

Figure 2:
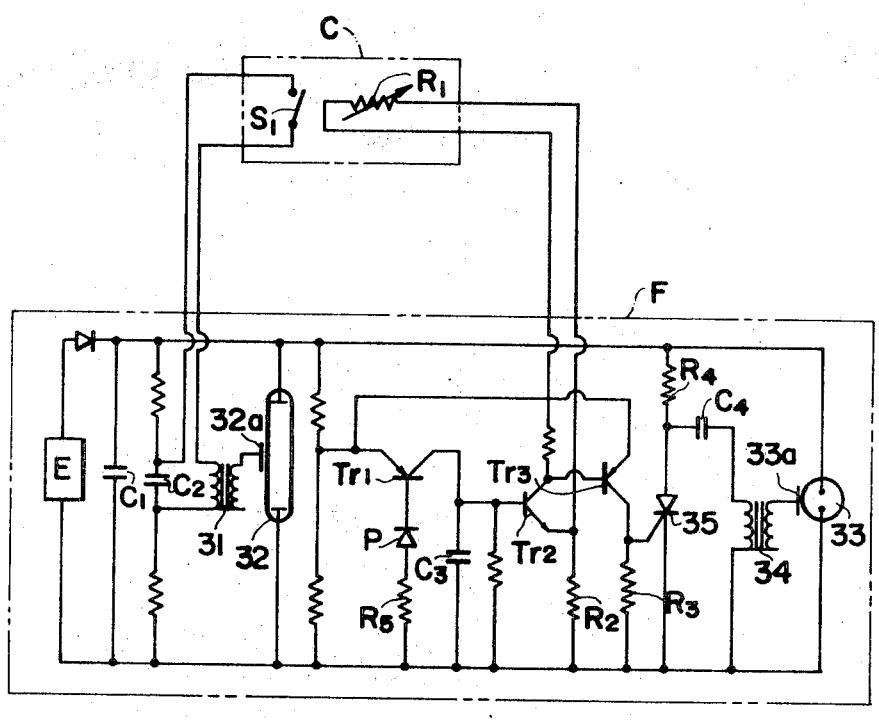
FIG. 2 is an electric circuit for the embodiment of FIG. 1.

FIG. 2 is a diagram of the electronic flash circuit in accordance with the present invention, wherein F indicates the flash side and C indicates the camera side.

Main capacitor $C_1$ and lighting capacitor $C_2$ are parallelly connected to power source E through resistances on both sides thereof, and radiation discharge tube 32, and second discharge tube 33 are connected to power source E as shown; and SCR 35 is connected to power source R through resistor $R_4$. Main capacitor $C_1$ energizes the discharge tube, and is charged by boosting power source E. Both terminals of capacitor $C_2$ are connected through synchro-switch $S_1$, which is actuated when the shutter on the camera side C is opened, and the primary winding of transformer 31. One terminal of the secondary winding of transformer 31 is connected to trigger electrode 32a of radiation discharge tube 32.

Photosensitive element P is connected through resistance $R_5$ to the base of transistor $Tr_1$. Photosensitive element P may, or example, comprise a selenium cell or a silicon photoelectric cell which has a rapid response to light rays. The collector of transistor $Tr_1$ is connected to capacitor $C_3$ and the base of transistor $Tr_2$. And, the collector of transistor $Tr_2$ is connected to the base of transistor $Tr_3$, and the emitter of transistor $Tr_1$ and the emitter of transistor $Tr_3$ are connected to each other. Variable resistance $R_1$ on the camera side C and fixed resistance $R_2$ on the flash side F are connected in series to the collector of transistor $Tr_2$. Resistance $R_3$ is connected to the collector of transistor $Tr_3$ and also to the gate of SCR 35.

Capacitor $C_4$ and the primary winding of transformer 34 are connected in parallel with SCR 35 and are connected through resistance $R_4$ to power source E. One terminal of the secondary winding of transformer 34 is connected to trigger electrode 33a of second discharge tube 33. Second discharge tube 33 preferably has an impedance which is smaller than that of radiation discharge tube 32.

Figure 3:
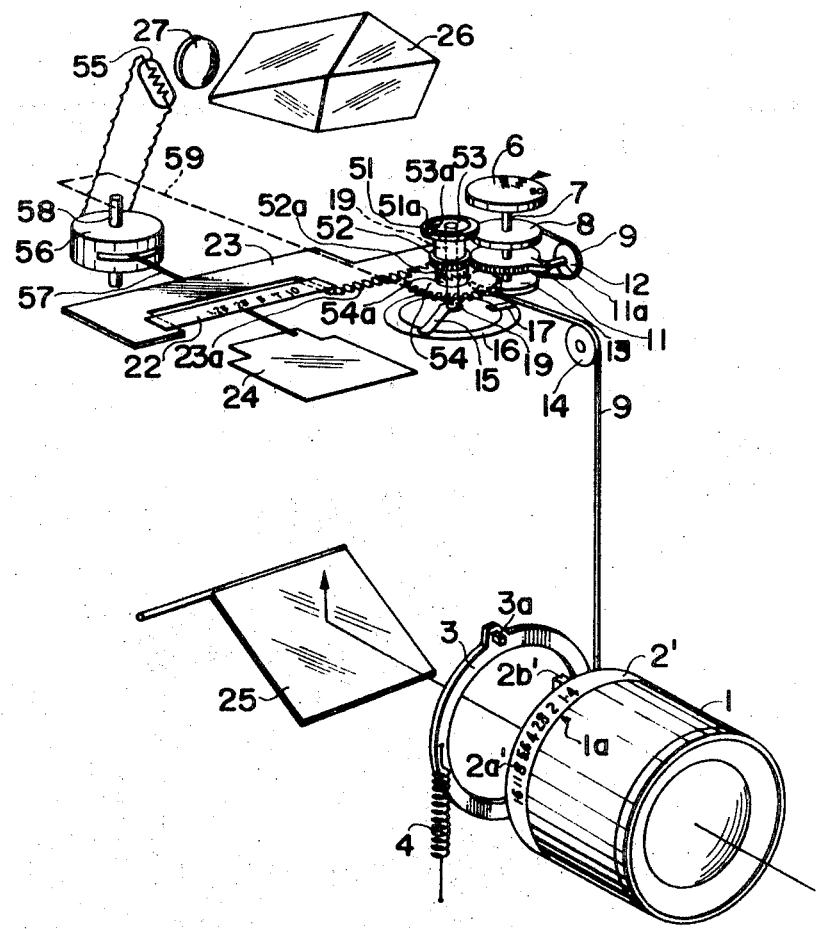
FIG. 3 is a perspective view showing the essential portion of a second embodiment in accordance with the present invention.

FIG. 3 shows a second embodiment of the invention of the TTL type wherein the light rays passing through an interchangeable lens of the opening diaphragm are measured. Also the diaphragm setting is interlocked to the exposure meter and the diaphragm setting is also transmitted to the automatic light adjusting type electronic flash device. The opening diaphragm setting of the interchangeable lens is arranged to be changed-over by mounting the opening diaphragm change-over plate on the camera side. The same numerical designations are used for the components that are the same as those illustrated in FIG. 1.

The diaphragm of interchangeable lens 1 is biased to be fully open and stopped down to the diaphragm setting value of preset diaphragm ring 2' during exposure. Lug 2'b of preset diaphragm ring 2' engages with riser 3'a of interlocking member 3. Gear 52 meshed with sector gear 11 is provided with clutch pawl 52 to engage with clutch pawl 54a provided on large gear 54 and mounted loosely onto central spindle 19 and integrally formed with opening diaphragm value indication ring 51.

Opening diaphragm setting change-over plate 53, on which index 53a is indicated, is mounted to the upper end of central spindle 19. Gear 54 is mounted to the middle portion of central spindle 19, and clutch pawl 54a of large gear 54 ordinarily engages with clutch pawl 52a of gear 52 by means of a spring not shown in the drawing. Opening diaphragm setting change-over plate 53 is slidably in contact with the internal circumference of opening diaphragm setting indication ring 51 on which opening diaphragm scale 51a is marked. And, by pushing down opening diaphragm setting change-over plate 53, the coupling of both gears 52, 54 is disconnected and by turning opening diaphragm setting change-over plate 53, the relative position of both gears 52, 54 can be moved to index a different opening diaphragm scale 51a upon index 53a.

Movable contact piece 15 is mounted to the lower end of central spindle 19, and in the same manner as in the first embodiment, variable resistance $R_1$ is formed by annulus resistance 16 and fixed contact piece 17. By depressing and turning opening diaphragm setting change-over plate 53, the relative position of gears 52, 54 can be changed as described above and at the same time the value of movable resistance $R_1$ can be changed.

Pentagonal prism 26 and photoconductive element 55 are mounted for measuring light rays passing through eye lens 27 to constitute a TTL exposure meter. And the indication of pointer 57 of exposure meter 56 connected to photoconductive element 55 is effected by spindle 58 thereof. Central spindle 19 is coupled mechanically by coupling member 59 to the exposure meter, and the zero point position and the deflection angle thereof are adjusted in accordance with the rotation of central spindle 19.

Since the present invention is formed as described above, in FIG. 1 upon turning film sensitivity setting dial 6 to index scale 6a upon index 5 in accordance with the film sensitivity, spindle 7 is turned, first pulley 8 is also turned in the same direction. Because one end of wire 9 is fastened to first pulley 8 and the other end is fastened to interlocking member 3 and riser 3a of interlocking member 3 is in engagement with coupling lug 2b of diaphragm setting ring 2, interlocking member 3 is restrained in accordance with the diaphragm setting. Thereby, a certain length of wire 9 is expanded and/or contracted, and second pulley 12 is moved, and accordingly arm 11a of sector gear 11 is turned.

Therefore, because of the expansion and contraction of wire 9 second pulley 12 is moved and simultaneously therewith sector toothless gear 11 is turned to rotate gear 18 meshed therewith. Indication plate 23 meshed with large gear 21 is moved either right or left and distance scale plate 22 is moved relative to viewing field frame 24.

And, upon turning diaphragm setting ring 2 on lens barrel 1 to another diaphragm setting, coupling lug 2b of diaphragm setting ring 2 is in engagement with riser 3a of interlocking member 3 so that interlocking member 3 is turned. However, first pulley 8 is at a standstill so that second pulley 12 is moved in the same manner as in the case where film sensitivity setting dial 6 is turned as described above. Sector gear 11 is turned as much as the moving portion of second pulley 12, and gear 18 is meshed with sector gear 11, large gear 21 is integral with gear 18 and is rotated, indication plate 23 is moved, and distance scale plate 22 is moved relative to viewing field frame 24.

That is, distance scale plate 22 is moved in accordance with the film sensitivity and the diaphragm setting, and the scale thereof indicates the distance limits for flash photography corresponding to the aforementioned settings.

Figure 4:
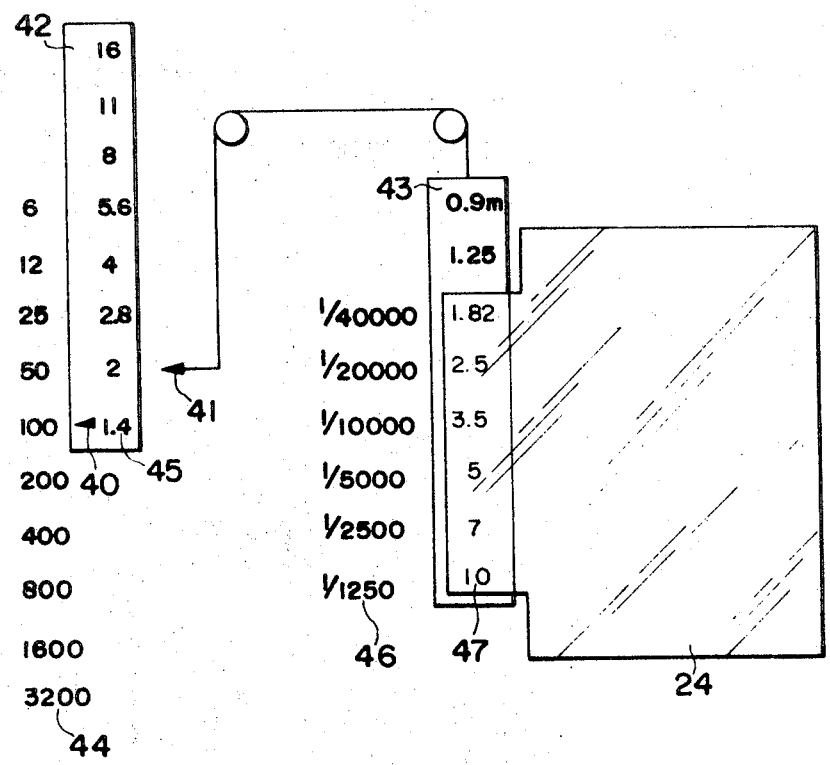
FIG. 4 illustrates the relationship between the principle photographic parameters in the present invention.

The relationships described above will be explained more fully with reference to FIG. 4.

By turning film setting dial 6, index 40 of diaphragm setting plate 42 is indexed with film sensitivity scale 44 (set for 100 in FIG. 4) and by moving diaphragm value plate 42 index 41, connected to distance scale plate 43, is indexed with diaphragm setting 45. And from the flash control time 46 in connection with the film sensitivity and the diaphragm settings a certain photographic distance 47 can be obtained. In the example shown in the drawing, supposing the film sensitivity is ASA 100 and the guide number of an electronic flash connected to the camera main body is 20, and when set to a diaphragm value F2, the flash time at a photographic distance of 10m is 1/1250 second. Thus, by controlling the flash time of the electronic flash connected to the camera main body from 1/40000 to 1/1250 second, the photographic distance corresponds to 10 to 1.82m.

And, by turning gear 18 and large gear 21, indication plate 23 is moved, and the length of annulus resistor 16 between fixed contact piece 17 and movable contact piece 15 undergoes a change and the film sensitivity and the diaphragm settings are applied to variable resistance $R_1$. The control of flash time corresponding to both settings can be effected by the electric circuit.

Next, th control of the radiation of the flash and the the time thereof will be explained with reference to FIG. 2. After the shutter is opened, when synchroswitch $S_1$ on the camera side C is closed, trigger electrode 32a of radiation discharge tube 32 is energized by the voltage of capacitor $C_2$ and transformer 31, and radiation discharge tube 32 is triggered while discharging main capacitor $C_1$. The flash light is reflected depending upon the distance to an object, room factors, etc. from the object and received by quick response photocell P. Therefore, an electric current proportional to the light incident upon photocell P is amplified by transistor $Tr_1$ and charged by capacitor $C_3$.

Therefore, in response to the turning of film sensitivity setting dial 6 and diaphragm ring 2, movable contact piece 15 shown in FIG. 1 is rotated, and the film sensitivity and the diaphragm settings previously set up are transmitted via resistor 16 to adjust the trigger level in the control circuit for the timing of the electronic flash.

Now, when the charging voltage of capacitor $C_3$ attains the trigger level of transistor $Tr_2$, determined by variable resistance $R_1$ and fixed resistance $R_2$, transistors $Tr_2$ and $Tr_3$ are made conductive, so that the trigger voltage is impressed onto the gate of SCR 35 and SCR 35 is energized. Just as SCR 35 is energized capacitor $C_4$ is discharged and the second discharge tube 33 is triggered through transformer 34, and the remaining charge of main capacitor $C_1$ is all discharged by second discharge tube 33. Thereby the flash from flash discharge tube 32 is instantly terminated.

Therefore, in accordance with the film sensitivity and the diaphragm settings, the flash time of the electronic flash can be automatically controlled.

Next, in the second embodiment, in the case of measuring light rays passing through the photographic lens, the opening diaphragm setting is transmitted to photoconductive element 55. Accordingly, the TTL exposure meter receives the stop down setting from preset diaphragm ring 2' by means of diaphragm ring interlocking member 3. In such TTL photometry, therefore, the stop down quantity from the opening diaphragm setting is interlocked with the exposure meter. The rotation of gear 52, therefore, depends upon the film sensitivity setting and the stop down quantity from the opening diaphragm setting to the diaphragm setting on preset diaphragm ring 2', and the rotation of gear 52 is interlocked with the exposure meter of TTL. Therefore, when the opening diaphragm setting of interchangeable lens 1 is different the information thereof is required to be transmitted to the flash side and in the second embodiment such transmission is provided. In order to change the relative position between gear 52 and large gear 54 because of the difference of the opening diaphragm diameter of interchangeable lens 1, upon pressing opening diaphragm setting change-over plate 53, large gear 54 descends downwardly to disengage clutch pawl 54a of large gear 54 from clutch pawl 52a of gear 52 and accordingly index 53a on opening diaphragm setting change-over plate 53 can be indexed with diaphragm setting indication ring 51. Central spindle 19 is also rotated and accordingly variable contact piece 15 fixed to spindle 19 is also turned so that variable resistance $R_1$ is changed in accordance with the change of the opening diaphragm setting.

The other operations are the same as in the first embodiment so that any further explanation thereof is unnecessary.

Figure 5:
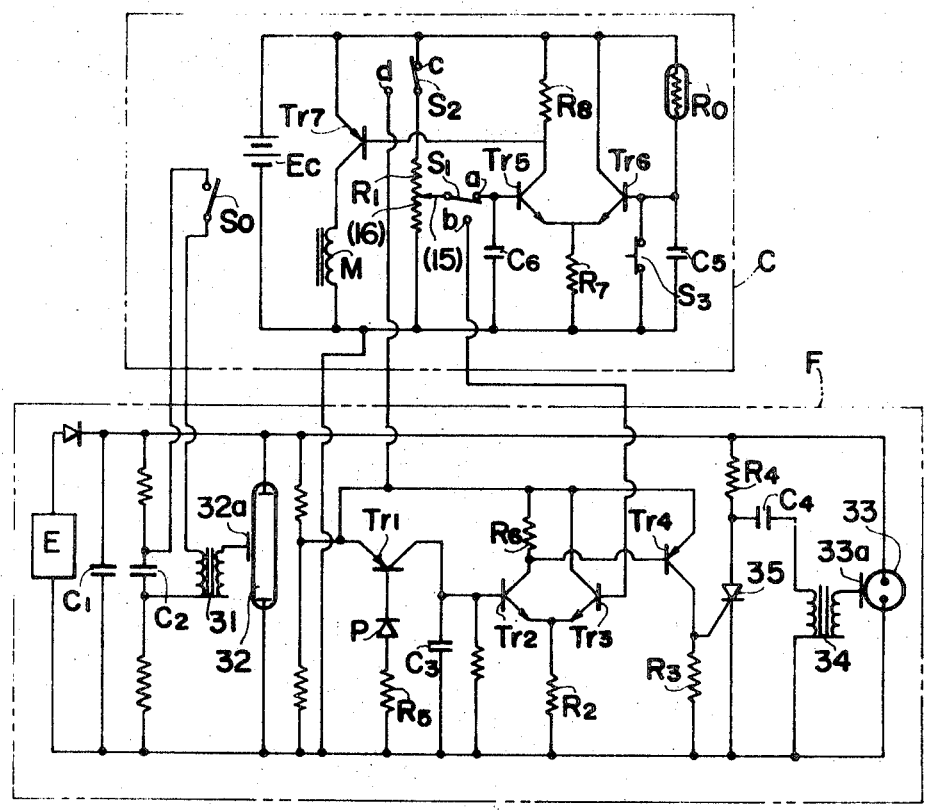
FIG. 5 is a second embodiment of an electric circuit diagram in accordance with the present invention.

The second embodiment of a control circuit shown in FIG. 5 is formed to operate in a camera provided with an electric shutter wherein the shutter speed is automatically controlled in accordance with the brightness of an object, the diaphragm and the film sensitivity settings, and wherein the diaphragm setting for regulating the electric shutter control circuit and the resistance setting in accordance with the film sensitivity are transmitted to the flash control circuit in the electronic flash device. The mechanical operating mechanism is similar to the embodiment shown in FIG. 1 and an operating value is established as the resistance of variable resistance 16 in accordance with the diaphragm and the film sensitivity settings, and the electric circuit thereof is described in detail hereinafter with reference to FIG. 5. The flash control circuit for flash tube 32 and the discharge circuit for discharge tube 33 extinguishing the flash are the same as in the first embodiment shown in FIG. 2.

The flash control circuit for integrating the reflected light from an object and emitting an output upon attaining a set level has photosensitive element P inserted between the base of transistor $Tr_1$ and resistance $R_5$. Photosensitive element P preferably comprises a selenium cell or a silicon photoelectric cell as in the first embodiment.

The collector of transistor $Tr_1$ is connected to capacitor $C_3$ and the base of transistor $Tr_2$. The emitter of transistor $Tr_1$ and the emitter of transistor $Tr_4$ are connected to each other and to terminal $d$ of change-over switch $S_2$ for the electric shutter control circuit on the camera side C.

Transistor $Tr_2$ and transistor $Tr_3$ have common bias resistance $R_2$ inserted respectively in the emitters thereof, and the collector of transistor $Tr_2$ is connected to the base of transistor $Tr_4$ through resistance $R_6$ to constitute a differential amplifier circuit. The base of transistor $Tr_3$ is connected to terminal b of change-over switch $S_1$ on the camera side C.

Switches $S_1$ and $S_2$ on the camera side C are changed over respectively from terminal a to terminal b and from terminal c to terminal d prior to the shutter operation.

The collector of transistor $Tr_4$ is connected to fixed resistance $R_3$ and the gate of SCR 35.

As shown in FIG. 5, the following components are connected to power source $E_c$ as follows: transistor $Tr_7$ through electromagnet M; variable resistance $R_1$ through change-over switch $S_2$; both transistors $Tr_5$, $Tr_6$ through bias resistance $R_7$; and photoconductive element $R_o$ through capacitor $C_5$.

Transistors $Tr_5$, $Tr_6$ have their respective emitters connected to bias resistance $R_7$, and the collector of transistor $Tr_5$ is connected to the base of transistor $Tr_7$ and resistance $R_8$. The base of transistor $Tr_6$ is connected to capacitor $C_5$ and switch $S_3$ which is opened when the shutter is opened to constitute a differential amplifier circuit.

Figure 6:
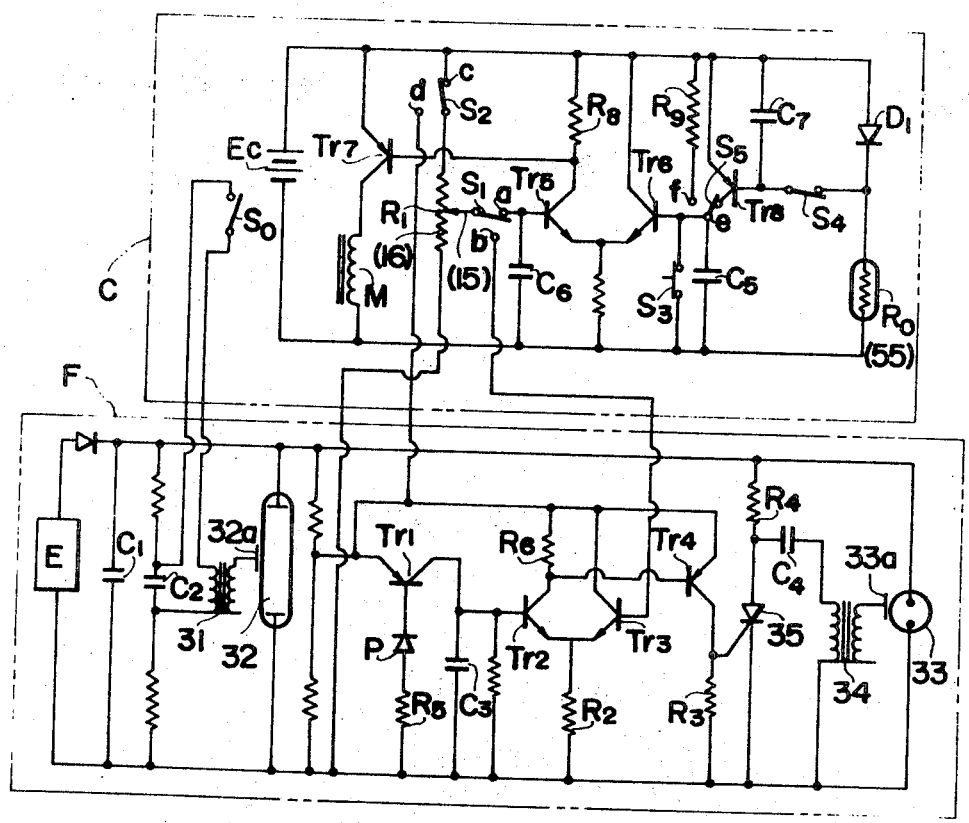
FIG. 6 is a third embodiment of an electric circuit diagram in accordance with the present invention.

FIG. 6 shows the third embodiment of a control circuit for use in TTL type cameras wherein the diaphragm setting is interlocked with the exposure meter for the electric shutter, and operates with the mechanism of the second embodiment shown in FIG. 3 and the formation on the flash side F in the electric circuit is the same as in the embodiment shown in FIG. 5. On the camera side C of the electric circuit, transistor $Tr_8$ is connected to capacitor $C_5$, and the collector of transistor $Tr_8$ is connected to the base of transistor $Tr_6$. Capacitor $C_7$ and diode $D_1$ are connected in parallel to the base of transistor $Tr_8$ and between them there is provided switch $S_4$ which is opened just before the shutter is opened. And, for daylight photographing the light quantity incident upon photoconductor element $R_o$ is logarithmically compressed by diode $D_1$ and the voltage across diode $D_1$ is transmitted to capacitor $C_7$. And also, for flash photographing switch $S_5$ is changed over from contact e to contact f and to delay capacitor $C_5$ resistance $R_9$ is connected to effect the exposure for 1/30 second, which is predetermined.

That is, for daylight photographing switches $S_1$, $S_2$, $S_5$ are connected respectively to contacts $a, c, e$ to display the resistance of variable resistance $R_1$ and set up on variable resistance 16 shown in FIG. 3, the opening diaphragm setting of the interchangeable lens, the stop down value of the preset diaphragm setting, and the film sensitivity setting, so as to be stored by capacitor $C_6$. The logarithmically compressed signal representing the brightness of the object is transmitted to be stored by capacitor $C_7$. And, when the shutter is released, switch $S_4$ is first opened and then the movable mirror is turned and the diaphragm is stopped-down to a preset setting. And, just as switch $S_3$ is opened the voltage of condenser $C_7$ is transmitted by transistor $Tr_8$ to charge capacitor $C_5$, and when that voltage corresponds to the voltage stored by capacitor $C_6$ the differential amplifier circuit energizes electromagnet M through transistor $Tr_7$. And, for flash photographing switch $S_5$ is changed over to contact $f$ and capacitor $C_5$ is connected to resistance $R_9$ to constitute the delay circuit of about 1/30 second. Switches $S_1$ and $S_2$ are changed over from contacts $a, c$ to contacts $b, d$ respectively prior to the exposure, and the opening diaphragm setting of the interchangeable lens, the stop down setting, and the film sensitivity setting are transmitted to the electronic flash device through resistance $R_1$ to control the flash thereof.

I claim:

1. Apparatus for controlling the exposure of an electronic flash device and flash control circuitry for a camera, comprising:
   an electrically operated shutter including
   a diaphragm setting ring for a lens in the camera, an interlocking member engaging with said diaphragm setting ring,
   a film sensitivity setting member,
   an operation mechanism connected to said interlocking member and said film sensitivity setting member,
   a photometric circuit including a photoconductive element for generating an output corresponding to the brightness of an object,
   an electromagnet for starting the closing of the shutter,
   and a differential amplifier circuit for operating said electromagnet and having a variable trigger level;
   said flash control circuit includes
   a photosensitive element for receiving light rays of an object including the reflected light rays of the flash device,
   an integrating circuit for integrating the output of said photosensitive element,
   and a trigger circuit for extinguishing said electronic flash device when the integrated value of said integrating circuit is substantially equal to the trigger level of said differential amplifier;
   means for changing the trigger level of said differential amplifier circuit;
   means for changing the trigger level in said trigger circuit; and
   means for transmitting the preset diaphragm setting and the film sensitivity setting from said operation mechanism to said trigger circuit.

2. Apparatus for controlling the exposure of an electronic flash device and flash control circuitry for a camera, comprising:
- a diaphragm biased to be open in an interchangeable lens of said camera;
- a preset diaphragm ring for said diaphragm;
- an interlocking member engaging with said preset diaphragm ring when an interchangeable lens is mounted to the camera;
- a film sensitivity setting member;
- an operation mechanism connected to said film sensitivity setting member and said interlocking member;
- an exposure meter having a photosensitive element for receiving object light rays passing through said opening diaphragm;
- a means for adjusting the indication of said exposure meter in accordance with the movement of said operation mechanism;
- an electric shutter control circuit including a photometric circuit including said photosensitive element, an electromagnet for starting the closing of the shutter, and a differential amplifier circuit for operating said electromagnet and having a variable trigger level;
- means for changing the trigger level in said electric shutter in accordance with the movement of said operation mechanism;
- an integrating circuit for integrating the output of said photosensitive element;
- said flash control circuit including a trigger circuit for extinguishing said electronic flash tube when the integrated value of said integrating circuit is substantially equal to the trigger level of said differential amplifier circuit; and
- means for transmitting the preset diaphragm setting and the film sensitivity setting from said operation mechanism to said trigger circuit.

3. A combination of a camera and an electronic flash device set forth in claim 2, wherein said camera is provided with an operation mechanism comprising:
- a spindle supported rotatably on the camera main body;
- a film sensitivity setting dial fixed to said spindle;
- a first fixed pulley fixed to said spindle;
- a second rotatable pulley supported rotatably on said spindle;
- a partially toothless gear supported rotatably on said spindle and having an arm extending in the axial direction;
- a planetary pulley supported rotatably on said arm;
- a flexible string body one end of which is fastened to said first fixed pulley and the other end of which is fastened to the periphery of said interlocking member, being spread over said planetary pulley and second rotatable pulley;
- a sleeve provided with a gear meshed with said partially toothless gear and formed with an annulus opening diaphragm indication portion on one end thereof and a saw-tooth shaped clutch tooth on the other end thereof;
- a central spindle fitted rotatably and slidably in said sleeve and provided on one end thereof with a disc shaped opening diaphragm indication portion for cooperating with said annulus opening diaphragm indication portion, and a saw-tooth shaped clutch tooth meshable with said saw-tooth shaped clutch tooth of said sleeve; and
- a variable resistance which value is changed through the rotation of said central spindle;
- and a means for adjusting the indication of the exposure meter in interlocking with the rotation of said central spindle, a means for changing the trigger level in the electric shutter in interlocking with the rotation of said central spindle, and a means for changing the trigger level in the trigger circuit in said electronic flash device in interlocking with the rotation of said central spindle.

4. Apparatus for controlling the exposure of an electronic flash device and flash control circuitry for a camera, comprising:
- means for generating an electronic flash;
- a flash control circuit including a light measuring circuit for receiving light from an object illuminated by said means for generating an electronic flash and for generating electric current in response thereto, integrating means for integrating said electric current, and means responsive to said integrating means for terminating the flash at a predetermined level of said integrated current;
- a diaphragm aperture setting member;
- a film speed setting member;
- biasing means for adjusting said predetermined level, and
- means for interconnecting said biasing means with said diaphragm aperture setting member and said film speed setting member so that said biasing means is adjusted as a function of the diaphragm aperture setting and the film speed setting.

5. Apparatus as in claim 4, wherein said means for interconnecting said biasing means with said diaphragm aperture setting member and said film speed setting member comprises:
- a rotatable first spindle;
- a film speed setting dial and a first pulley mounted to said first spindle;
- a second pulley and a sector gear rotatably supported to said film speed setting dial and having an arm extending radially therefrom;
- a planetary pulley supported rotatably on said arm;
- a rotatable second spindle;
- first and second gears, a distance scale indicating member, and a member for adjusting said biasing means, said first gear engaging with said sector gear; and
- an interconnecting member and a flexible wire one end of which is fastened to said first pulley and the other end of which is fastened to said interconnecting member for interconnecting said biasing means with said diaphragm aperture setting member, said wire being spread over said planetary pulley and said second pulley.

6. Apparatus as in claim 4 further comprising:
- an exposure control circuit including a second light measuring circuit receptive to light from an object to be photographed and for generating electric current in accordance therewith, means for terminating exposure, and a switching circuit for actuating said means for terminating exposure.

7. Apparatus as in claim 6 wherein said exposure control circuit further includes switch means for connecting said biasing means to said switching circuit.

8. Apparatus as in claim 6, further comprising:

an exposure meter actuated by said second light measuring circuit; and means for adjusting said means for interconnecting whereby said biasing means are adjusted in accordance with the indication of said exposure meter.

9. Apparatus as in claim 8, wherein said camera has an interchangeable objective lens attachable to the camera body, and a diaphragm having an opening tendency and said diaphragm setting member is a preset member for presetting diaphragm aperture settings further comprising:

an interlocking member engaging with said preset member when said interchangeable objective lens is attached to the camera body and wherein said switching circuit is a differential amplifier.

10. Apparatus as in claim 9 wherein said means for interconnecting said film speed setting member and said diaphragm aperture setting member with said biasing means comprises:

a first rotatable spindle, a film speed setting dial and a first pulley mounted to said first spindle, a second pulley and a sector gear rotatably supported on said first pulley, said sector gear having an arm extending in the radial direction;

a planetary pulley supported rotatably on said arm;

a flexible wire one end of which is fastened to said first pulley and the other end of which is fastened to the periphery of said interlocking member, said wire being spread over said planetary pulley and said second pulley;

a sleeve having a gear engaging with said sector gear, said sleeve including a fully opened diaphragm scale on one end thereof and a saw-tooth shaped clutch on the other end thereof;

a second spindle mounted rotatably and slidably in said sleeve and provided on one end thereof with an index for indicating a selected diaphragm setting from said scale, and a second saw-tooth shaped clutch engageable with said first saw-tooth shaped clutch;

a variable resistance adjustable by rotation of said second spindle;

means for adjusting said second spindle in accordance with the indication of said exposure meter;

means for adjusting the level of said switching circuit in the exposure control circuit in accordance with the impedance of said variable resistance; and switching means for transmitting said impedance to said flash control circuit for adjusting the level thereof to terminate the flash.

* * * * *